(12) United States Patent
Schneider et al.

(10) Patent No.: US 10,752,453 B2
(45) Date of Patent: Aug. 25, 2020

(54) JOINING APPARATUS, LOADING STATION, SUPPLY ARRANGEMENT AND METHOD FOR LOADING A MAGAZINE

(71) Applicant: NEWFREY LLC, New Britain, CT (US)

(72) Inventors: Manuel Schneider, Giessen (DE); Christopher Kaus, Giessen (DE); Florian Zinke, Giessen (DE); Manuel Spiess, Giessen (DE)

(73) Assignee: NEWFREY LLC, New Britain, CT (US)

( * ) Notice: Subject to any disclaimer, the term of this patent is extended or adjusted under 35 U.S.C. 154(b) by 0 days.

(21) Appl. No.: 15/883,580

(22) Filed: Jan. 30, 2018

(65) Prior Publication Data

US 2018/0222696 A1 Aug. 9, 2018

(30) Foreign Application Priority Data

Jan. 30, 2017 (DE) .......................... 10 2017 101 705

(51) Int. Cl.
*B23P 19/00* (2006.01)
*B21J 15/32* (2006.01)
(Continued)

(52) U.S. Cl.
CPC .............. *B65G 65/00* (2013.01); *B21J 15/32* (2013.01); *B23P 19/001* (2013.01);
(Continued)

(58) Field of Classification Search
CPC ........ B21J 15/32; B21J 15/025; B23P 19/001; B23P 19/006
See application file for complete search history.

(56) References Cited

U.S. PATENT DOCUMENTS 2,592,636 A * 4/1952 Aherne-Heron ......... B21J 15/32
29/812.5
3,597,826 A * 8/1971 Shields .............. A61M 5/31511
29/777
(Continued)

FOREIGN PATENT DOCUMENTS

DE  102005015032 A  10/2006
IE  102009040764 A   3/2011
(Continued)

OTHER PUBLICATIONS

Translation of DE 10 2005 015 032, Oct. 5, 2006, pp. 7-8.*
German Search Report dated Aug. 29, 2017.

*Primary Examiner* — Kaitlin S Joerger
(74) *Attorney, Agent, or Firm* — Michael P. Leary; Kofi A. Schulterbrandt

(57) ABSTRACT

A joining apparatus magazine temporarily stores a plurality of joining elements loaded from a loading station and feeds the joining elements to a joining head connected to an assembly line robot. The magazine comprises a housing connectable to the joining head; a drive motor; and a rotary body rotatable about an axis by the drive motor. The rotary body includes a plurality of chambers for temporarily storing joining elements. The magazine further comprises a loading arrangement operable for loading joining elements into the chambers; and an unloading arrangement operable for discharging a joining element from the chamber toward the joining head. The loading arrangement and the unloading arrangement are coupled together such that either a chamber can be loaded or a chamber can be unloaded.

12 Claims, 10 Drawing Sheets

(51) Int. Cl.
  *B21J 15/02* (2006.01)
  *B65G 65/00* (2006.01)
  *B65G 61/00* (2006.01)

(52) U.S. Cl.
  CPC ............ *B23P 19/006* (2013.01); *B65G 61/00* (2013.01); *B21J 15/025* (2013.01); *B23P 2700/50* (2013.01); *B65G 2814/0311* (2013.01)

(56) References Cited

U.S. PATENT DOCUMENTS

| | | | | |
|---|---|---|---|---|
| 4,099,324 A | * | 7/1978 | Johnson | H05K 13/043 221/234 |
| 8,015,686 B2 | * | 9/2011 | Hain | B21J 15/32 219/98 |
| 8,047,416 B2 | * | 11/2011 | Davies | B21J 15/32 227/120 |
| 8,141,761 B2 | * | 3/2012 | Draht | B21J 15/32 173/1 |
| 8,690,037 B2 | * | 4/2014 | Wenzel | B21J 15/32 227/116 |
| 8,776,354 B2 | * | 7/2014 | Herrmann | B21J 15/32 29/525.11 |
| 10,207,313 B2 | * | 2/2019 | Riotte | B21J 15/142 |
| 2006/0113222 A1 | * | 6/2006 | Kiener | B23P 5/00 209/561 |
| 2015/0174711 A1 | * | 6/2015 | Hain | B21J 15/18 29/798 |
| 2017/0072521 A1 | * | 3/2017 | Munstermann | B65G 29/00 |
| 2018/0154487 A1 | * | 6/2018 | Pfaffenrath | B23P 19/005 |

FOREIGN PATENT DOCUMENTS

| | | |
|---|---|---|
| JP | H072309 B2 | 1/1995 |
| WO | 007751 A | 2/2000 |

* cited by examiner

JOINING APPARATUS, LOADING STATION, SUPPLY ARRANGEMENT AND METHOD FOR LOADING A MAGAZINE

CROSS-REFERENCE TO RELATED APPLICATION

This application claims priority from German Patent Application No. 102017101705.4, filed on Jan. 30, 2017, the disclosure of which is incorporated herein by reference.

BACKGROUND OF THE INVENTION

The present invention relates to a magazine, in particular a revolving magazine, for temporarily storing a plurality of joining elements, comprising a housing that can be fastened to a joining head, a rotary body that can be rotated about an annular axis, preferably in steps, by means of a drive motor, a plurality of chambers for receiving joining elements being formed on the rotary body, a loading arrangement by means of which joining elements can be loaded into the chambers, and an unloading arrangement by means of which the joining elements received in the chambers can be unloaded into a joining head.

The invention also relates to a joining apparatus having a joining head that comprises a holding device for holding a joining element and a magazine for temporarily storing a plurality of joining elements that can be transferred individually into the holding device by means of a transfer device.

Furthermore, the invention relates to a loading station for a joining apparatus.

The invention further relates to a supply arrangement for supplying joining elements, in particular for a loading station of the aforementioned type, comprising a supply tube, the first end of which can be connected to a joining element provision device and the second end of which can be connected to a loading station for loading a magazine of a joining head, the supply tube being arranged in an arc-like manner having a portion rising from the first end up to an apex point and a portion falling from the apex point to the second end, it being possible to supply a joining element from the first end towards the second end by means of compressed air.

Lastly, the invention relates to a method for loading an above-described magazine arranged on a joining head of an above-described joining apparatus.

In the field of joining technology, it is known to join joining elements, such as earthing bolts, to workpieces such as vehicle bodyworks. The joining process can involve welding the joining element to the workpiece, referred to as stud welding. It is also known to bond joining elements to workpieces in what is known as stud bonding. Moreover, it is known to use joining elements to produce joints. Joining elements of this kind can be rivets for example, in particular punch rivets, used to connect/rivet two or more workpieces together.

In vehicle bodywork construction, joining processes of this kind are widely used. Punch rivets are used, for example, to connect bodywork sheets. Joining elements such as plastics bolts or metal bolts are joined, i.e. welded or bonded to bodywork portions, these joining elements then being able to be used as anchors for additional fastening tasks or as earthing bolts for earthing the vehicle electronics. In this case, it is known to attach plastics or metal clips to bolts that protrude from a sheet, which clips are then used to secure wires or cable strands to the bodywork. It is also known to fasten vehicle interior parts to protruding bolts.

To carry out such joining processes, joining apparatuses that are often mounted on robots are used, particularly in bodywork construction. It is particularly advantageous in this case if a high clock rate can be achieved in the joining processes. Therefore, the joining elements used are preferably supplied to the joining apparatus in an automated manner. Typically, this occurs, for example, by a stationary supply device separating the joining elements and then conveying them to a joining head of the joining apparatus by means of compressed air via a supply tube. In the joining head, the joining element is then usually loaded into a holding device and held ready for the joining process.

However, using a flexible supply tube of this kind on a robotic joining head is disadvantageous in some respects. In particular, supply tubes of this kind are prone to increased wear, in particular due to the joining movement of the joining head and the associated high stresses on the supply tubes.

Supplying the elements by means of a supply tube leads to high blast air requirements. In addition, using flexible tubes can cause the tube to kink, which may lead to a joining robot stopping. This can result in the joining process sequence being held up. Moreover, supplying the elements via a supply tube entails long supply times.

To prevent this problem, it is known to secure a magazine to a robotic joining head. This magazine is preferably designed to receive a plurality of joining elements, meaning that an accordingly high number of joining processes can be carried out one after the other. Once the magazine is empty, the robot can move the joining head to a loading station at which the magazine is preferably refilled.

In magazines of this kind, the joining elements received therein are generally received directly adjacent to one another either axially or in the circumferential direction. It is known in this respect to clamp the joining elements in a chamber of a magazine of this kind. It is also known to convey joining elements into a larger chamber, in which case it must actively be ensured, for example by subsequently closing the chamber, that the joining elements remain in the chamber until they are eventually conveyed out of the magazine to the joining head.

For example, DE 10 2005 015 032 A1 discloses an apparatus for supplying joining elements to a preparation device, comprising a magazine for receiving the joining elements and a device that is connected to the magazine and intended for separating and transferring the joining elements to the preparation device, the magazine comprising a plurality of chambers, each chamber being intended for receiving just one joining element, the chambers forming a practically endless row, and a chamber being connectable to a supply channel at a first point and to a transfer channel at a second point, it being possible to actively block the channels to prevent the joining elements accidentally falling out.

SUMMARY OF THE INVENTION

Against this background, an object of the invention is to disclose an improved magazine arrangement, in particular a revolving magazine arrangement, an improved joining device, an improved loading station for a joining apparatus, an improved supply arrangement for supplying joining elements, and an improved method for loading a magazine.

In the case of the magazine mentioned at the outset, the above object is achieved by the loading arrangement and the unloading arrangement being coupled together such that either at least one chamber can be loaded or at least one, preferably exactly one, chamber can be unloaded. The loading arrangement and the unloading arrangement are preferably positioned on diametrically opposite sides of the rotary body and/or on axially opposite sides of the rotary body. In the present case, axial and radial should generally be taken to be in relation to axis of rotation of the rotary body, unless specified otherwise.

The above object is also achieved by a joining apparatus having a joining head that comprises a holding device for holding a joining element and a magazine of the type according to the invention, specifically for storing a plurality of joining elements that can be transferred individually into the holding device by means of a transfer device.

The above object is also achieved by a loading station for a joining apparatus according to the invention, comprising a stationary frame to which there is secured a loading device having at least one supply connection, which is preferably open at the top, for supplying a joining element and having at least one separation device designed to move a joining element, supplied to the separation apparatus via the supply connection, into a loading position from which the joining element can be transferred, under the effect of gravity, into a chamber of a magazine brought close to the loading station, the loading device comprising a protrusion designed to actuate a release slide of a loading arrangement of the magazine when brought close to the loading station, the loading station preferably comprising a compensating element that can compensate for tolerances when the release slide is mechanically actuated.

The above object is also achieved by a supply arrangement of the type mentioned at the outset, a joining element passage sensor being arranged in the region of the apex point and detecting when a joining element is in the region of the apex point during the supply of the joining element.

Preferably, the supply of compressed air can then be interrupted since the joining element will fall to the second end by itself or from the residual momentum and gravity.

A particular advantage here is that less compressed air may be used and damage to the joining elements and the supply tubes can be prevented due to less force being applied.

Lastly, the above object is achieved by a method for loading a magazine of the aforementioned type that is attached to a joining head of a joining apparatus of the aforementioned type, the method comprising the following steps:

a) horizontally moving the joining head towards a loading station and actuating the loading arrangement such that a magazine chamber to be loaded with a joining element is open at the top;

b) loading a joining element into the chamber; and c) horizontally withdrawing the joining head from the loading station.

The magazine according to the invention and the joining apparatus, loading station, supply arrangement and method for loading a magazine according to the invention have the advantages of a magazine that can be attached to a joining head. These include the fact that no supply tube has to be installed for the joining head, meaning that a relatively small disruptive contour may also be produced for the joining head. In addition, the movements of the robot arm are not restricted by the supply tube. Moreover, it is possible to prevent kinks in the supply tube and related supply malfunctions.

By providing a joining element passage sensor, the requirements for compressed or blast air can be reduced further.

Temporary storage of supply elements also makes it possible to shorten the clock rate of a joining robot, since only the small gap between the magazine and the holding position of the joining element in the joining head needs bridging prior to the joining process.

Providing chambers is also advantageous in that various types of joining element can be received in the same magazine, meaning, for example, that it is possible to join different types of joining element without having to completely empty and refill a magazine beforehand.

By coupling the loading arrangement and the unloading arrangement, it is possible to reliably prevent joining elements already received in the magazine from falling out when the magazine is being loaded.

The magazine is preferably in the form of a revolving magazine that can be rotated in particular in steps or chamber-by-chamber.

Preferably, the loading arrangement and the unloading arrangement are coupled together such that exactly one chamber can be loaded or exactly one chamber can be unloaded.

It is also preferable for the loading arrangement and the unloading arrangement to be arranged on diametrically opposite sides of the rotary body or of the axis of rotation and/or on axially opposite sides of the rotary body.

In the present case, the terms axial and radial should generally be taken to be in relation to the axis of rotation of the rotary body, unless specified otherwise in this case.

The object is thus achieved in full. According to a preferred embodiment, the loading arrangement and the unloading arrangement are mechanically coupled so as to implement the alternate loadability or unloadability.

In this case, it is advantageous that complex control electronics and complex sensor systems can be omitted due to the mechanical coupling. This can make the magazine less prone to malfunction.

It is particularly preferable for the loading arrangement and/or the unloading arrangement to be able to be mechanically actuated.

This can make the construction of a system containing the magazine more cost-effective since no additional actuators need to be used in order to release or block the loading arrangement and/or the unloading arrangement. In addition, no extra control devices are required for the loading arrangement and unloading arrangement, making the design simpler, more cost-effective and less prone to malfunction.

In another preferred embodiment, the loading arrangement comprises a release slide that can slide radially relative to the rotary body between a release position and a closed position and can be actuated through an opening in the housing such that, when the release slide is moved towards a loading station, it can be actuated by means of a protrusion on the loading station.

When moved towards the station, the release slide can thus be moved from the closed position into the release position, the input arrangement also preferably being blocked at the same time. Preferably, the release slide is mechanically pre-tensioned into the closed position, the unloading arrangement thus being mechanically pre-tensioned into the open position. When moving the magazine radially and horizontally towards the protrusion on the loading station, the release slide can preferably be moved from the closed position into the open position. Preferably, the protrusion is implemented by the housing in the form of a loading protrusion. The loading station preferably conveys joining elements by means of pneumatic actuators, such that the joining elements can be loaded into the chambers in a direction parallel to the axis of rotation of the rotary body. In the process, the release slide can preferably be coupled to an end switch that is activated when the loading arrangement is fully open in order to initiate the loading process.

Providing a release slide means that a mechanical coupling can be produced in a cost-effective and simple manner, it being possible to prevent joining elements already received in the magazine being lost during operation of the joining head by preferably mechanically pre-tensioning the release slide into the closed position.

In another preferred embodiment, the chambers are each formed so as to be rotationally symmetrical about chamber axes that extend in parallel with the axis of rotation.

This advantageous arrangement of the chambers makes it possible to insert the joining elements into the chambers and remove them therefrom along the longitudinal axes of said elements, meaning that the joining elements can be transferred into a holding device of the joining head in the correct position. Furthermore, the joining elements can be transferred into the magazine under the effect of gravity, when the magazine is oriented accordingly. Alternatively, it is also possible to design the chambers such that their chamber axes are oriented radially.

In another preferred embodiment, which constitutes a separate invention in conjunction with the preamble of claim 1, the housing comprises a first fastening device for fastening the housing to a robot and a second fastening device for fastening the housing to a joining head, the first fastening device and the second fastening device preferably being arranged on axially opposite sides of the housing.

This simplifies the assembly of the magazine. This also makes the magazine capable of being retrofitted to robots that are already installed. This simplifies the maintenance and replacement of the magazine.

In another preferred embodiment, which constitutes a separate invention in conjunction with the preamble of claim 1, the unloading arrangement comprises a pivot joint receptacle for receiving, in the manner of a pivot joint, an end of a transfer duct into which a joining element can be unloaded from a chamber in order to be transferred to a holding device of a joining head.

As a result, disruptive contours on the joining head and wear to the arrangement for supplying the joining head can be further reduced.

In another preferred embodiment, the rotary body comprises at least first and second chambers arranged in different circumferential sectors of the rotary body.

As a result, various joining elements can be supplied to a joining head, and specifically without having to change the head, which can increase the clock rate or reduce downtime and thus increase the efficiency of the joining arrangement. It is conceivable in this case for the first and second chambers to be of a different shape in order to receive bolts or balls, for example.

In a preferred embodiment of the joining apparatus, a housing of the magazine is fastened to a robot arm, the joining head being fastened to a side of the housing of the magazine facing away from the arm of the robot.

The loading station according to the invention preferably comprises a supply connection for supplying a joining element, which connection is open at the top. In addition, the loading station preferably comprises a compensating element that can compensate for tolerances when the release slide is mechanically actuated.

In a preferred embodiment, which may constitute a separate invention in conjunction with the preamble of independent method claim 13, the rotary body comprises first and second chambers arranged in different circumferential sectors of the rotary body, wherein, in order to unload a first chamber, the rotary body is rotated in an opposite direction to that for unloading a second chamber.

This makes it possible to supply preferably at least two different types of joining element to the joining head in any order.

It goes without saying that the features described above and in the following cannot only be used in the combination stated, but can also be used in other combinations or in isolation, without departing from the scope of the present invention.

BRIEF DESCRIPTION OF THE DRAWINGS

Embodiments of the invention are shown in the drawings and explained in more detail in the following description. In the drawings.

DETAILED DESCRIPTION OF THE PREFERRED EMBODIMENTS

Figure 1:
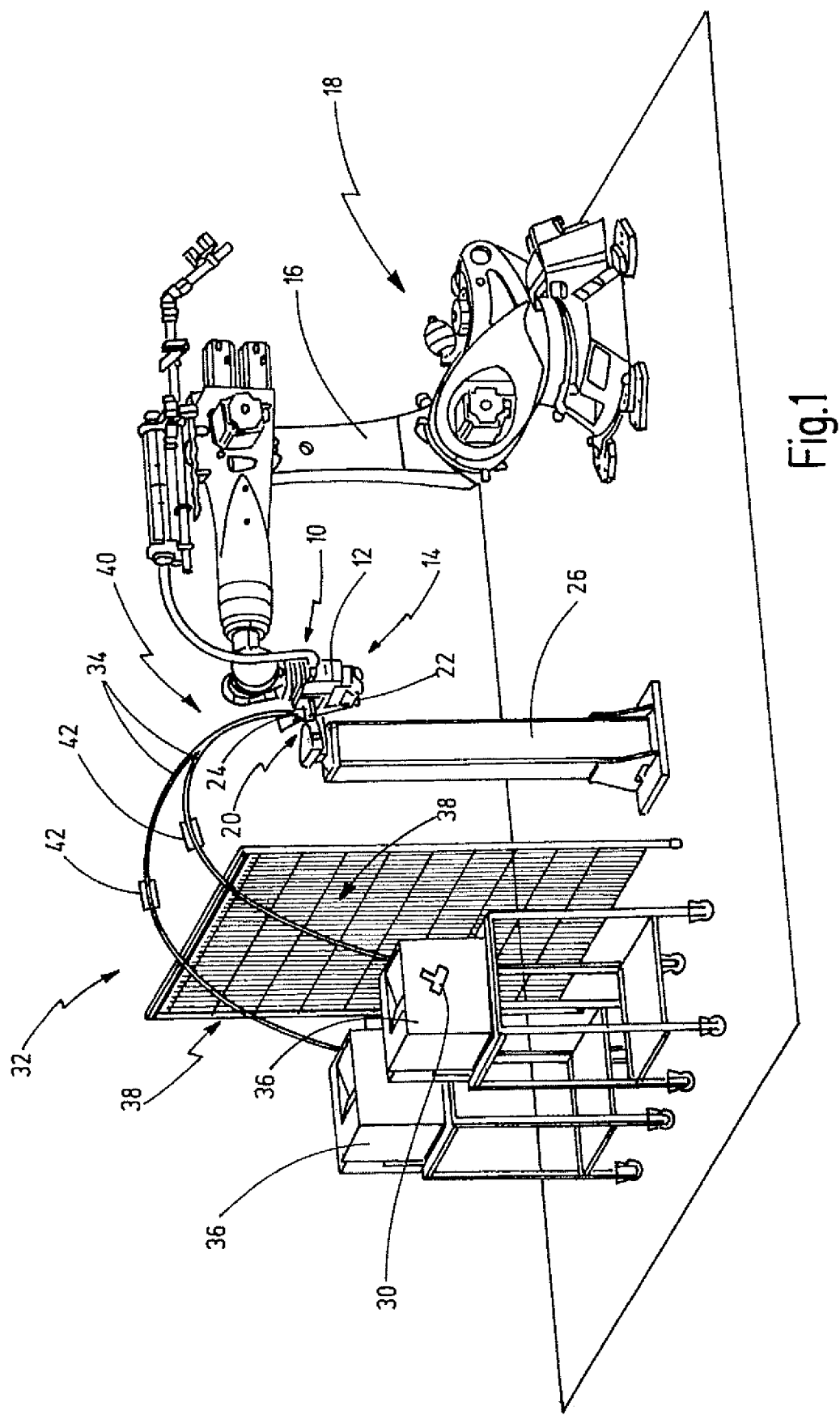
FIG. 1 is a schematic illustration of a joining robot having a first embodiment of a magazine according to the invention secured thereto, and of a loading station according to the invention.

FIG. 1 schematically shows a revolving magazine 10 having a revolving magazine housing 12 on a joining head 14. A robot arm 16 of a robot 18 is arranged on the opposite side of the housing 12 to the joining head 14.

The figure also shows a loading station 20 having a loading device 22, the loading station 20 having a protrusion 24 that is oriented towards the revolving magazine 10. The loading station 20 is arranged on a stationary frame 26 and comprises a separation device 28 (not shown in more detail) for separating supplied joining elements 30 (not shown in more detail for reasons of clarity).

A supply arrangement (denoted in general by 32) comprises supply tubes 34 that are connected to the loading station 20 at one end and to joining element provision devices 36 at the other end. The supply tubes 34 have a rising portion 38 and a portion 40 that falls towards the loading station 20. At the apex point of each supply tube 34, joining element passage sensors 42 are arranged for detecting when a joining element 30 has passed through a supply tube 34. In addition, a safety fence (not described in more detail below) can be arranged between the loading station 20 and the joining element provision devices 36.

In this example, two joining element provision devices 36, two supply tubes 34 and two joining element passage sensors 42 are shown. It goes without saying that embodiments having just one joining element provision device 36, one supply tube 34 and one joining element passage sensor 42, or having three or more thereof, are also conceivable.

A joining element 30 is preferably provided to the loading station 20 from a joining element provision device 36 by means of compressed air. The joining element provision device 36 has a relatively large store of joining elements 30 (not shown in more detail) that are preferably blown into a supply tube 34 by means of compressed air, a joining element passage sensor 42 being able to detect when a joining element 30 has passed through the apex point of a supply tube 34. It is thus possible to interrupt the supply of compressed air into the supply tube 34 once a joining element 30 has passed the apex point, meaning that the joining element 30 reaches the loading station 20 through the falling supply tube portion 40 owing to the residual momentum or gravity. The revolving magazine 10 is then filled in the loading station 20, the precise filling process being described further below. It goes without saying that a joining element passage sensor 42 can also be provided at another point of the supply arrangement 32, for example upstream of the apex point in the supply direction.

It is generally conceivable to convey the joining elements 30 separately from the joining element provision device 36 to the loading station 20. It is also conceivable to use the loading station 20 to construct a joining element stack in a tube portion of the supply tube 34 in order to speed up a subsequent loading process for the revolving magazine 10.

Figure 2:
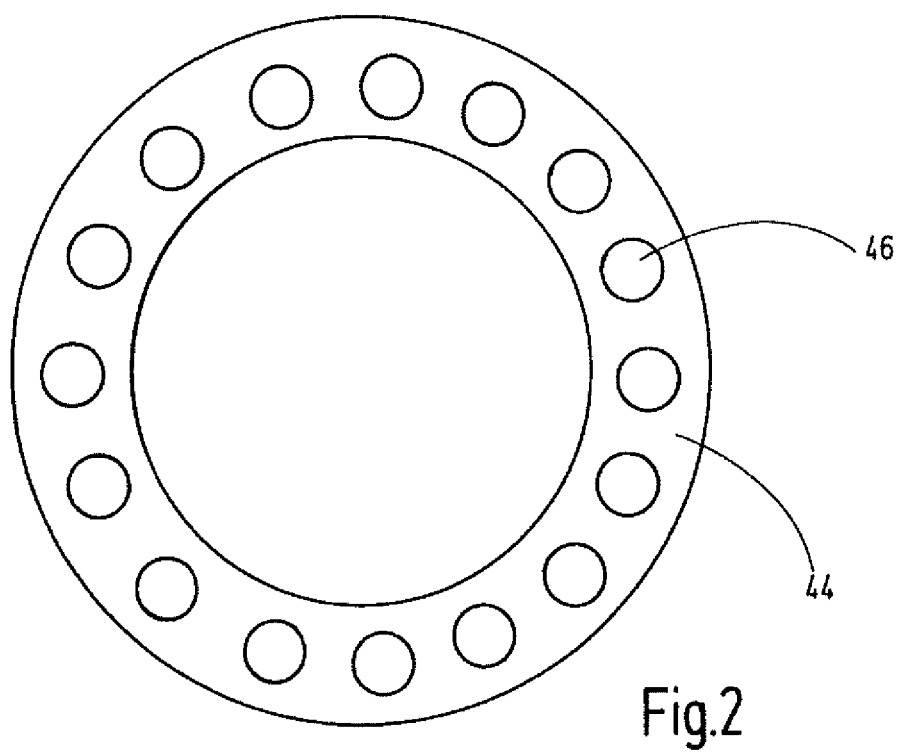
FIG. 2 is a schematic view of a rotary body of a magazine according to the invention.

FIG. 2 schematically shows a rotary body 44 of a revolving magazine 10. The rotary body 44 is in the shape of a hollow cylinder or ring, chambers 46 being distributed in the cylinder wall in the circumferential direction. The chambers 46 are preferably formed as through holes. It goes without saying that other forms are also possible.

Figure 3A:
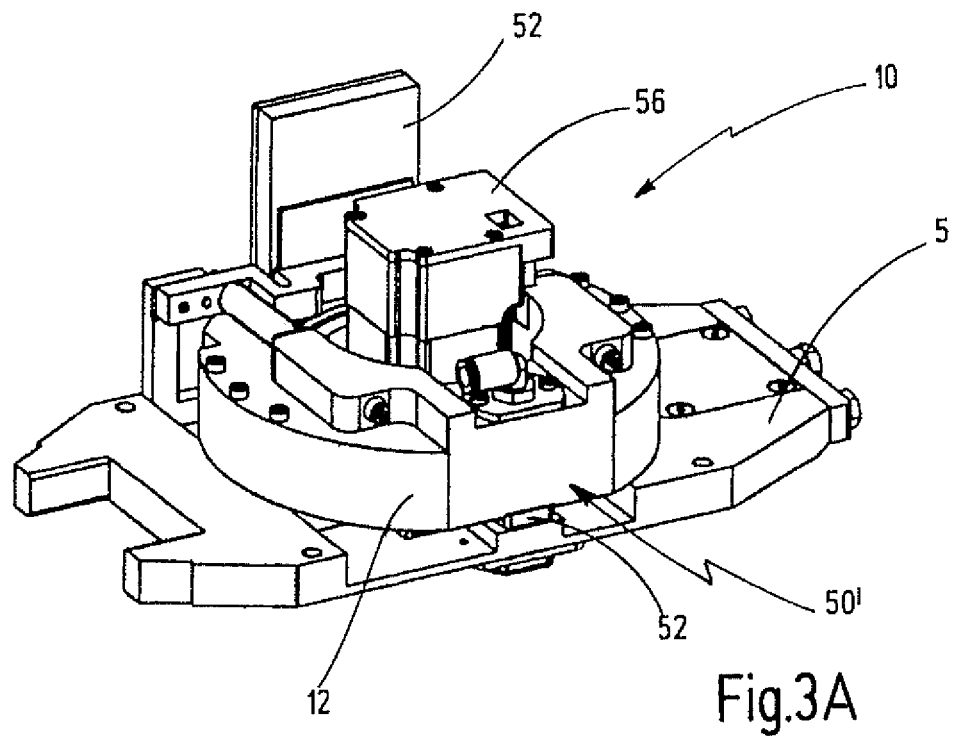
FIG. 3A is a first perspective view of a magazine according to the invention in the closed position.
Figure 3B:
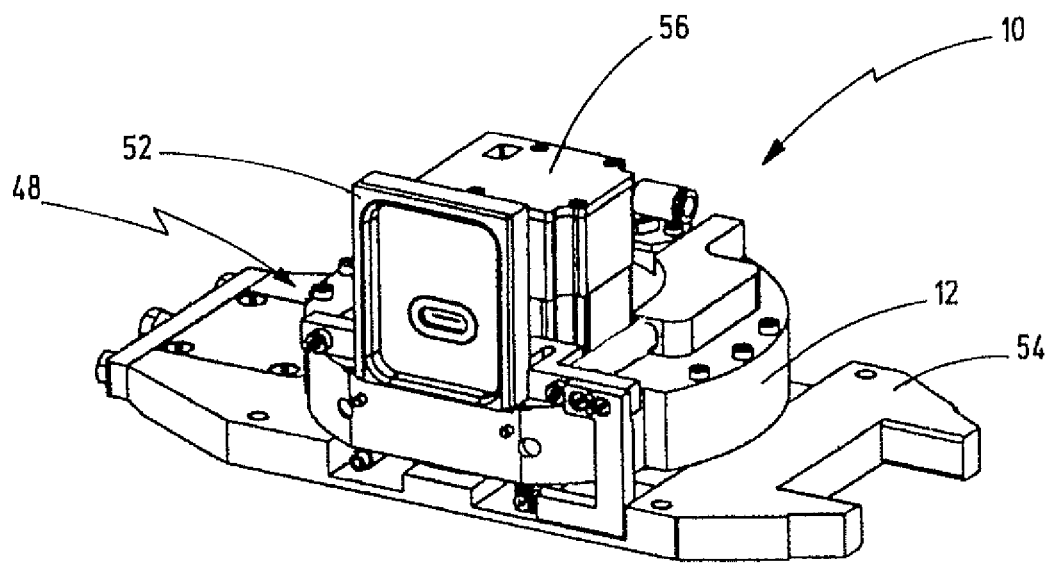
FIG. 3B is a second perspective view of the magazine in FIG. 3A.

FIGS. 3a and 3b are perspective views of a revolving magazine 10 in the closed position. FIG. 3a shows the unloading arrangement 50 that is opposite the loading arrangement 48. The loading arrangement 48 and unloading arrangement 50 comprise a release slide 52 that is pre-tensioned into the closed position by means of a spring in the embodiment shown. "Closed position" in this case means that the loading arrangement 48 blocks joining elements 30 from being supplied to the revolving magazine 10 and the unloading arrangement 50 in principle allows joining elements 30 to be unloaded, i.e. joining elements 30 to be supplied to the joining head 14, for example by releasing or no longer blocking a chamber 46 of the rotary body 44, which chamber is arranged within the unloading arrangement, such that a joining element 30 in said chamber can preferably be supplied to the joining head 14 by means of compressed air.

The revolving magazine 10 further comprises a first fastening device 54 for fastening the revolving magazine 10 to a robot 18 or robot arm 16 and a second fastening device 56 for fastening a joining head 14 to the revolving magazine 10. In other words, the revolving magazine 10 can thus be arranged between the robot arm 16 and the joining head 14.

Figure 4A:
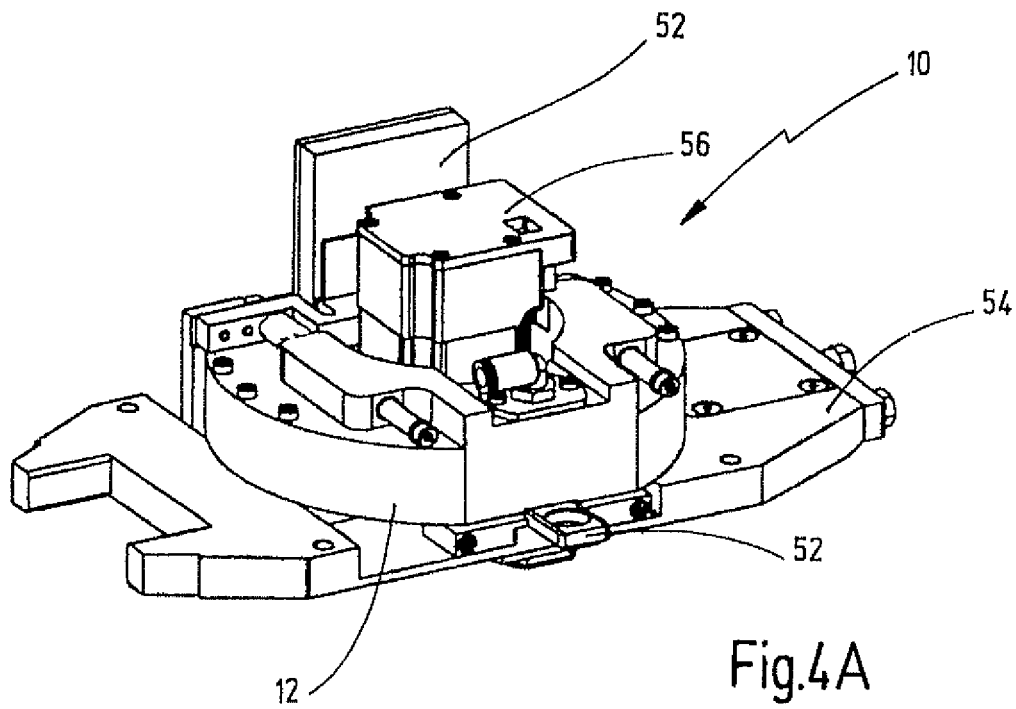
FIG. 4A is a first perspective view of a magazine according to the invention in the open position.
Figure 4B:
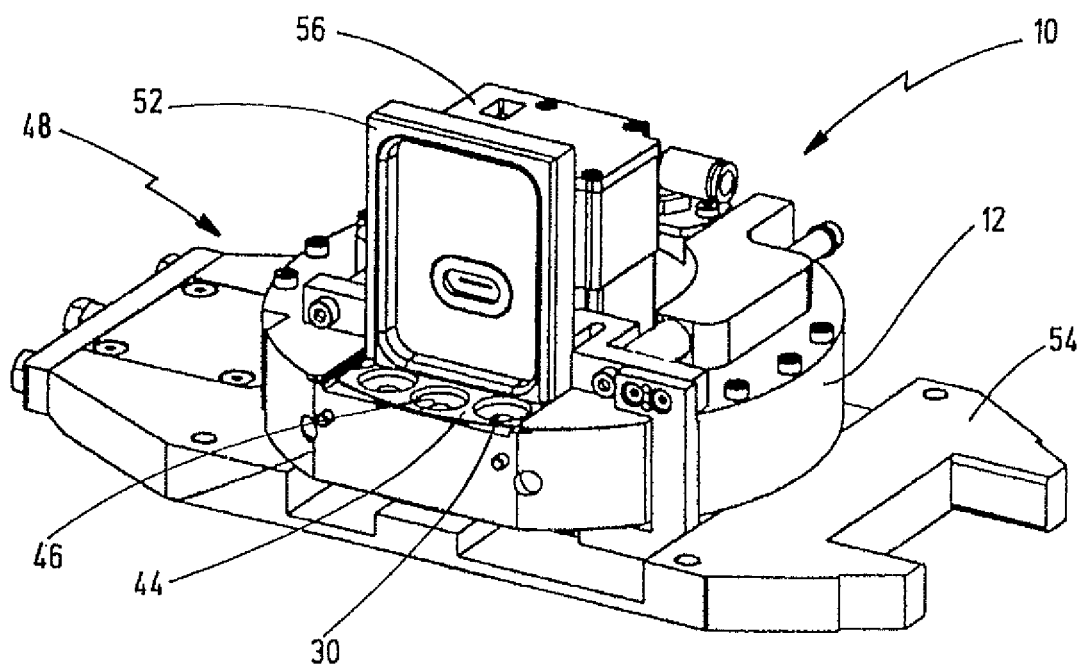
FIG. 4B is a second perspective view of the magazine in FIG. 4A.

FIGS. 4a and 4b show a revolving magazine 10 in the open position. Like components are provided with like reference numerals. Only the differences are discussed in the following. The release slide 52 is in the open position, so joining elements 30 can be supplied to the revolving magazine 10. For reasons of clarity, the loading station 20, the robot 18 and the joining head 14 are not shown in FIGS. 3 and 4. When in the open position, the release slide 52 is slid in the radial direction such that the unloading arrangement 50 blocks a joining element 30 from being withdrawn. In the open position, the loading arrangement 48 allows joining elements 30 to be supplied into a chamber 46 of the rotary body 44 associated with the loading arrangement 48.

It is particularly advantageous if an end switch that is actuated when the release slide 52 moves or slides radially is arranged on the revolving magazine 10. In this way, it is simple in terms of control and construction to detect when the release slide has reached or left the open position and to start, stop or interrupt a loading process.

Figure 5:
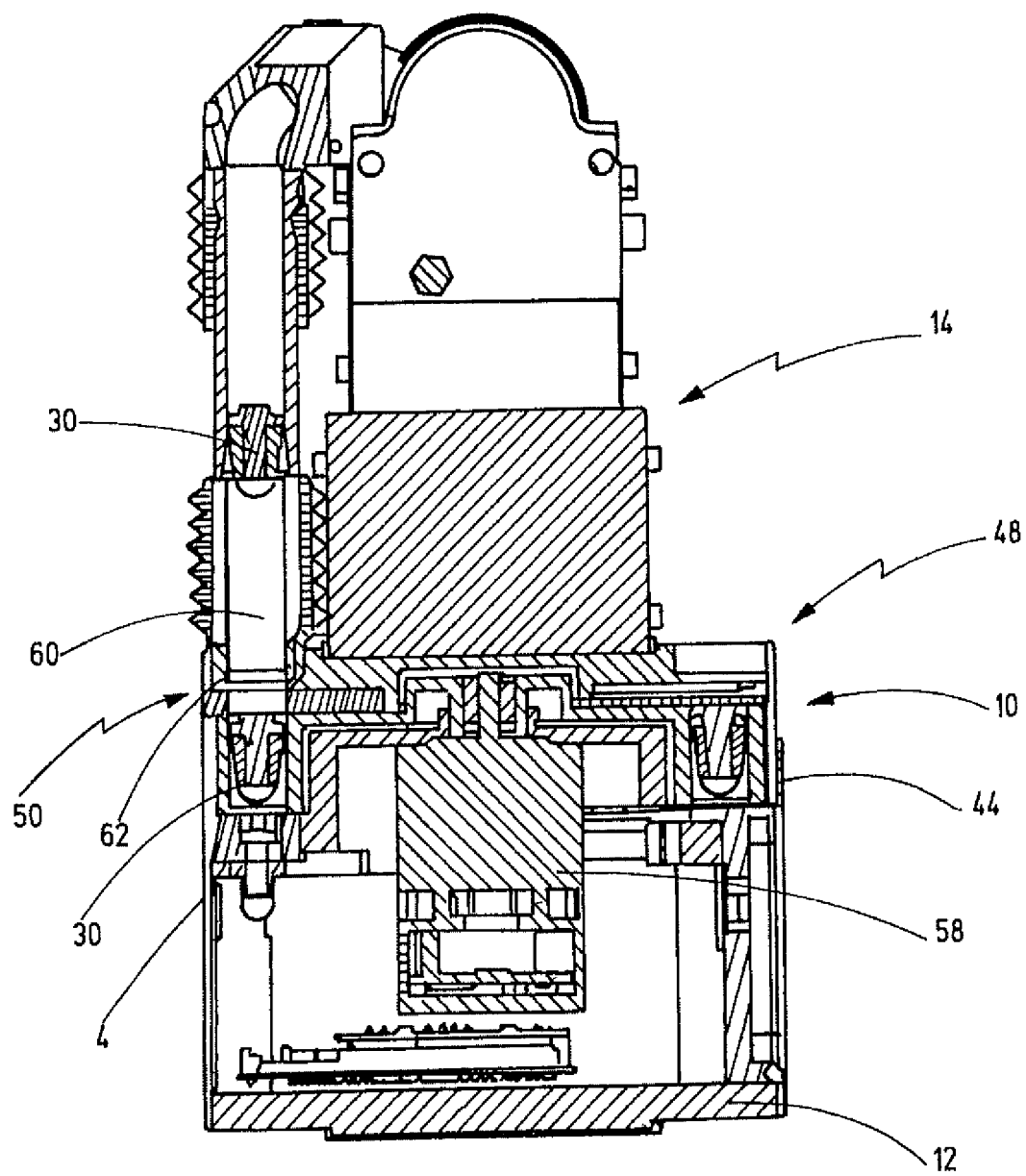
FIG. 5 is a section through a joining apparatus according to the invention along an axis of rotation of the rotary body.

FIG. 5 is a section through a revolving magazine 10 having a joining head 14 arranged thereon, along an axis of rotation of the rotary body 44. In this case, the revolving magazine 10 has a rotary body 44 formed substantially of a hollow cylinder having a disc connected, preferably integrally, to one axial end. The disc is used to connect the rotary body 44 to a motor 58, preferably a stepper motor, for rotating the rotary body 44 in steps. In this case, a chamber 46 containing a joining element 30 can be arranged in the unloading arrangement 50 during an unloading process, i.e. a process of supplying joining elements 30 to the joining head 14, or a chamber 46 can be arranged in the loading arrangement 48 during a loading process. It goes without saying that the motor 58 in this case can rotate in both rotational directions.

The release slide 52 is preferably mechanically pre-tensioned into the closed position. As a result, the unloading arrangement 50 is open, meaning that a joining element 30 received in a chamber 46 associated with the unloading arrangement can be withdrawn. This takes place, for example, by means of compressed air, a joining element 30 being blown into a transfer duct 60 and supplied to the joining head 14 via the transfer duct 60.

The transfer duct 60 is preferably in the form of a telescopic duct and is connected at one end, in the manner of a ball joint, to the unloading arrangement 50 by means of a ball joint 62 and at the other end to the joining head 14, such that, during a joining process, i.e. when the joining head 14 is travelling, the transfer duct 60 can remain on the joining head 14, the transfer duct 60 in the form of a telescopic duct extending axially. After a joining process, the joining head 14 is moved back counter to the joining direction, the telescopic transfer duct 60 shortening axially and being oriented substantially in parallel with the axis of rotation of the rotary body 44 of the revolving magazine 10, it now being possible to again supply a joining element 30 to the joining head 14.

After being supplied, the joining element 30 is preferably held in a joining position in a holding device 64 of the joining head 14. The joining head 14 can then travel in the joining direction, preferably by means of a carriage 66, such that the joining element 30 can be joined to a workpiece. This preferably takes place by means of arc welding, stud bonding or punch riveting.

Figure 6:
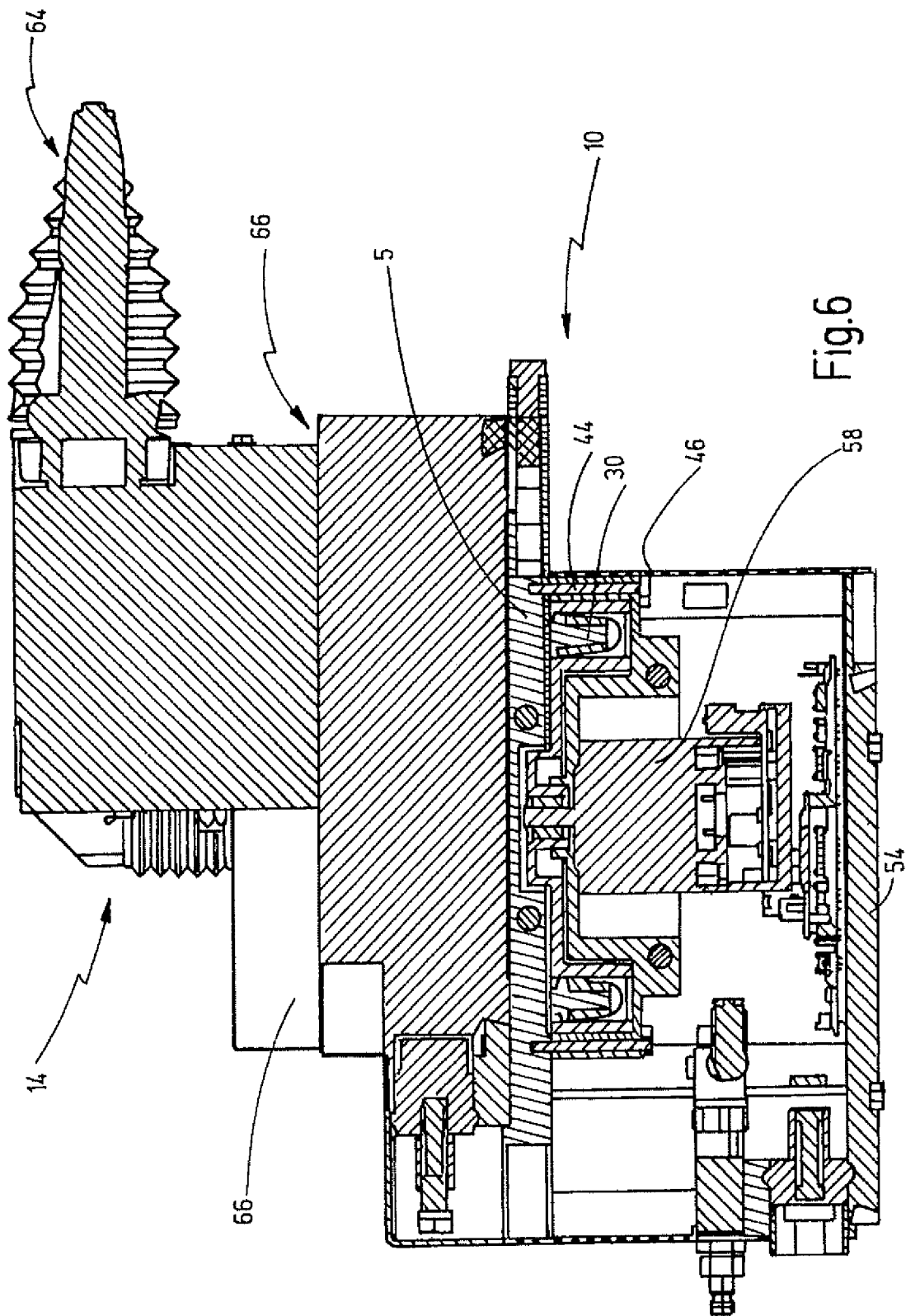
FIG. 6 is a section through a joining apparatus according to the invention along the axis of rotation of the rotary body, rotated by 90° compared with FIG. 5.

FIG. 6 shows another cross section through a revolving magazine 10 having a joining head 14 arranged thereon, the sectional plane being rotated through 90° in relation to the axis of rotation of the rotary body 44 compared with the section in FIG. 5. Like components are denoted by like reference numerals and will not be discussed further below. The joining head 14 comprises a joining element holding device 64 (shown schematically) and is mounted on the carriage 66 (not shown in more detail) so as to be axially movable in the joining direction.

In this drawing, the joining direction extends to the right. During a joining process, the joining head 14 slides to the right in the carriage 66, such that a joining element 30 held in the joining element holder 64 can be joined to a workpiece (not shown). The joining head 14 preferably travels by means of compressed air, mechanically or mechatronically. In the arrangement shown in FIG. 6, the joining head 14 is substantially in a joining position. In this position, the transfer duct 60 (not shown in FIG. 6) extends obliquely upwards towards the right.

Figure 7:
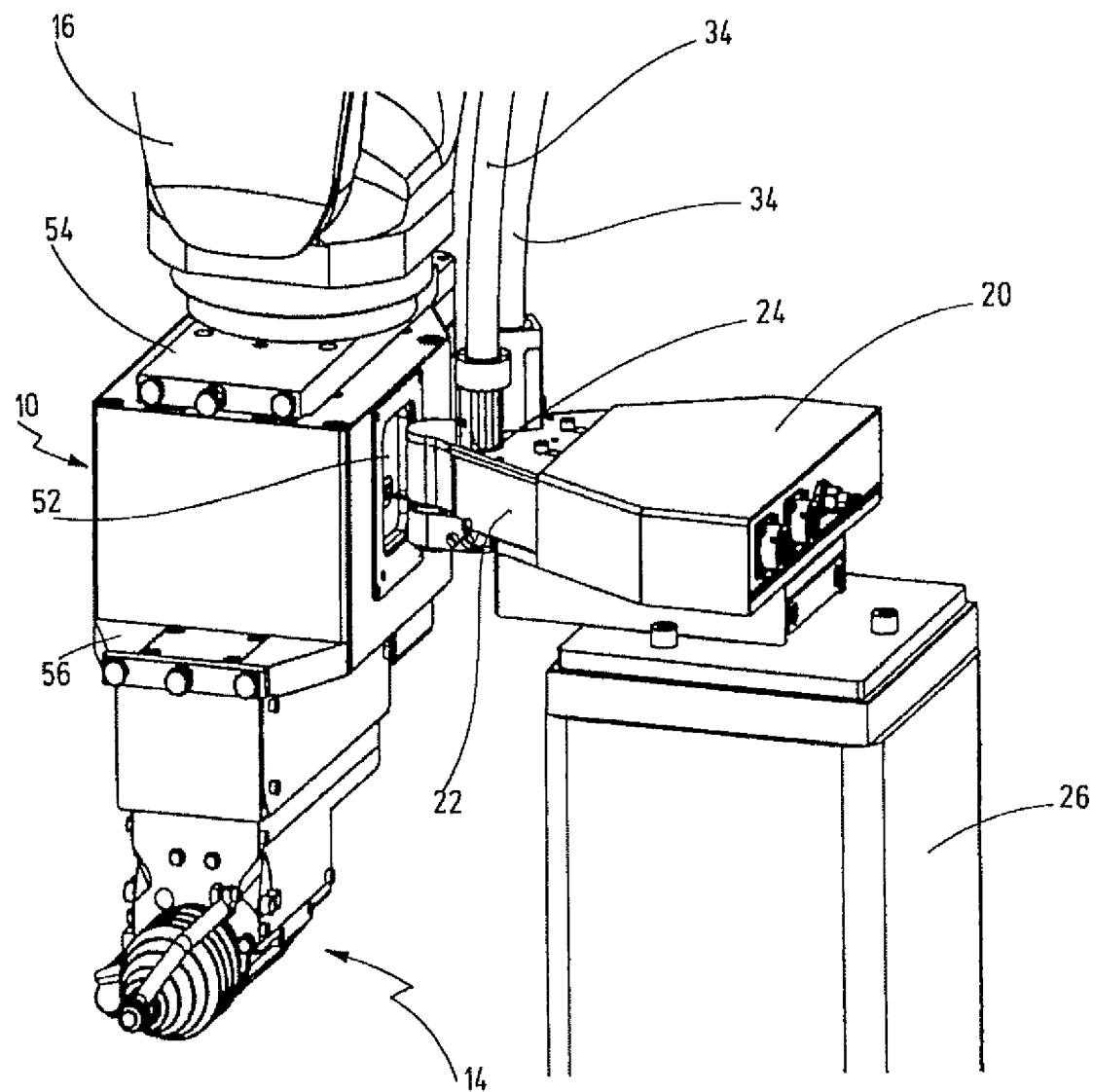
FIG. 7 is a schematic illustration of a joining apparatus according to the invention on a robot arm in a position shortly before or shortly after docking with a loading station according to the invention.

FIG. 7 shows a revolving magazine 10 that is arranged on a robot arm 16 and comprises a joining head 14 on the opposite side to the robot arm 16.

The revolving magazine 10 is shown shortly before or shortly after a loading process. The housing 12 of the revolving magazine 10 comprises an opening in such a way that the release slide 52 of the revolving magazine 10 can be radially slid by a protrusion 24 on a loading station 20. In this respect, the revolving magazine 10 is axially aligned with the protrusion 24 by means of the robot 18 or robot arm 16 such that the protrusion 24 can slide the release slide 52 radially in relation to the transverse axis of the rotary body 44 through the opening in the housing 12 of the revolving magazine 10. For this purpose, the revolving magazine 10 is preferably moved towards the protrusion 24 by means of the robot arm 10.

Here, the loading arrangement 48 is moved into the open position and thus the unloading arrangement 50 is moved into the blocked position. As a result, during a loading process and preferably by means of pneumatic slides, a joining element 30 can be transferred into a chamber 46 of the rotary body 44 by means of the open loading arrangement 48. First, a joining element 30 is supplied to the loading device 22 via a supply tube 34. The loading device 22 preferably comprises a separation device 28 (not shown in more detail), which then transfers or slides the joining element 30 into a loading protrusion (not shown in greater detail) located within the protrusion 24. In this case, a lower opening in the loading protrusion and an upper opening in a chamber 46 of the rotary body 44 are substantially axially aligned with each other, so when a joining element 30 is slid into the loading protrusion, the joining element 30 falls into the chamber 46 owing to gravity and the aligned openings.

In a further step, the rotary body 44 can be rotated further by means of the motor 58, such that a subsequent second chamber 46 is axially aligned with the loading protrusion and the separation device 28 can fill this chamber 46 by sliding a joining element 30 into the loading protrusion, as described above.

In the process, the loading device 22 can be connected to just one supply tube 34, in which case the revolving magazine 10 can only be filled with one type of joining element 30. As shown in FIG. 7, however, two supply tubes 34 can also be connected to the loading device 22.

The loading device 22 preferably comprises two pneumatic actuators, each of which pushes a joining element 30, supplied by the first supply tube 34 or by the second supply tube 34 of the loading device 22, into the loading protrusion and thus fills a chamber 46 of the rotary body 44 of the revolving magazine 10. In this way, the revolving magazine 10 can be filled with two different types of joining element 30', 30". It goes without saying that if three or more supply tubes 34 and three or more pneumatic actuators are provided, the revolving magazine 10 can be filled with three or more types of joining element.

FIGS. 8 to 10 schematically show various processes for filling the rotary body 10 or the revolving magazine 10.

Figure 8A:
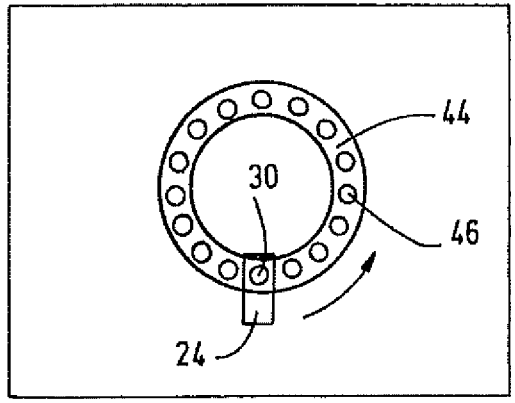
FIG. 8A through FIG. 8D is a schematic illustration of the method steps of a method according to the invention for filling a magazine according to the invention.

FIG. 8a schematically shows a rotary body 44, a chamber 46 of the rotary body 44 being aligned with the protrusion 24 on the loading station 20 such that a joining element 30 can be transferred into a chamber 46 of the rotary body 44 by means of the loading protrusion.

Figure 8B:
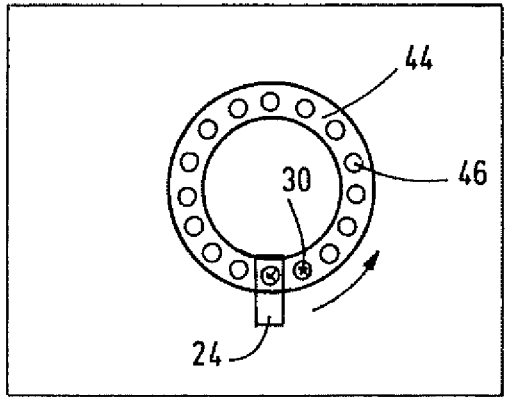

The rotary body 44 can then be rotated in the direction of the arrow by means of the motor 58, such that an empty chamber 46 is axially aligned with the protrusion 24 or the loading protrusion. As shown in FIG. 8b, this chamber 46 can then be filled with another joining element 30, in the manner described above.

Figure 8C:
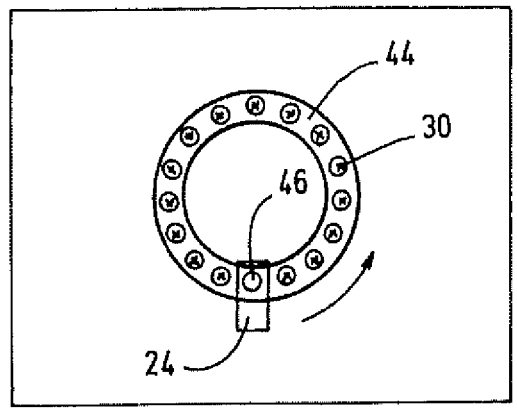

The rotary body 44 can then be moved further in steps, the chambers 46 continuing to be filled with joining elements 30, specifically until all the chambers 46 apart from one are filled with joining elements 30. This configuration is shown in FIG. 8c.

Figure 8D:
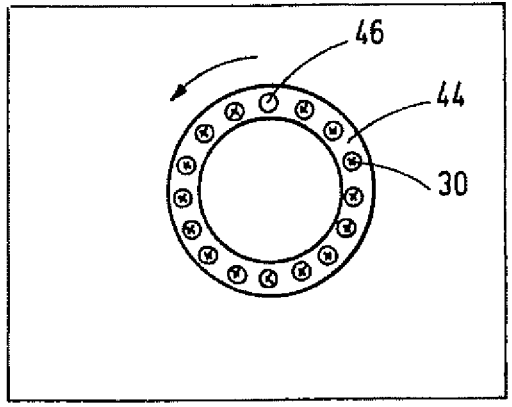
Figure 9A:
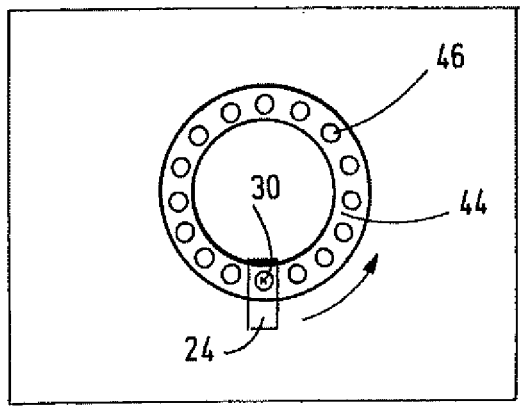
FIG. 9A through FIG. 9D is a schematic illustration of a preferred method for filling a magazine according to the invention; and FIG. 10A through FIG. 10D is a schematic illustration of the method steps of a preferred method for filling two different types of joining element into a magazine according to the invention.
Figure 9B:
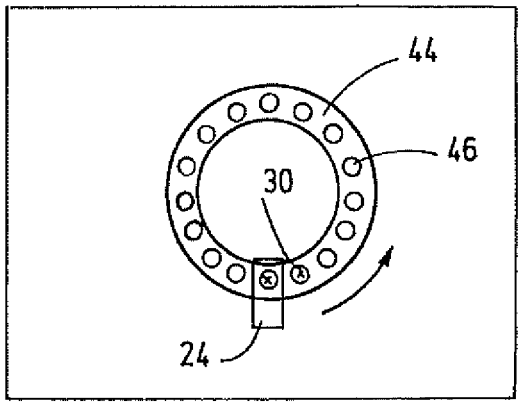
Figure 9C:
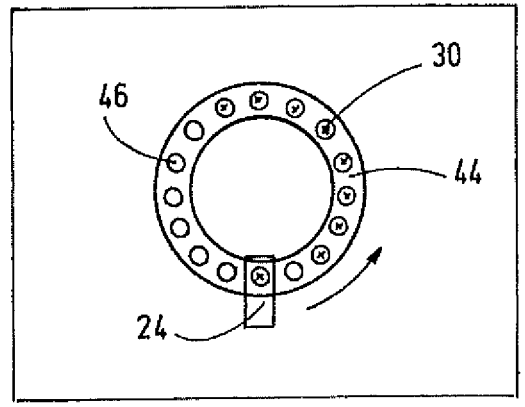
Figure 9D:
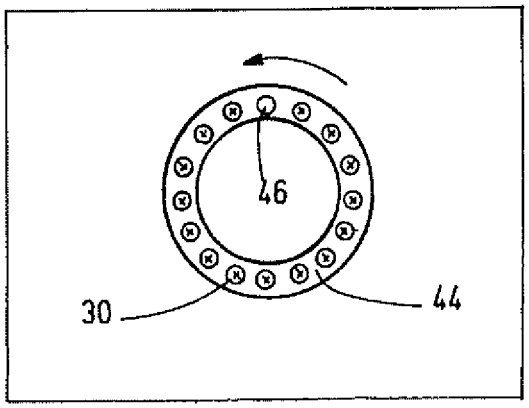

In FIG. 8d, the rotary body 44 is rotated through 180° compared with FIG. 5, such that the empty chamber 46 is arranged at the unloading arrangement. The revolving magazine 10 can be withdrawn from the loading station 20 such that the release slide 52 blocks the loading arrangement 48 and releases the unloading arrangement 50. As shown in FIG. 8d, the rotary body 44 can then be rotated further in the direction of the arrow, such that the joining elements 30 in the chambers 46 can be gradually supplied to the joining head 14, as described above. Since the chamber 46 associated with the unloading arrangement 48 is empty when the revolving magazine 10 docks, this can prevent the release slide 52 potentially becoming jammed. It goes without saying that the revolving magazine 10 can also be completely filled with joining elements 30.

Preferably, the revolving magazine 10 is filled with more joining elements 30 than required for the joining process. In this way, the revolving magazine 10 contains a reserve store of joining elements 30 in case one joining element 30 cannot be properly transferred into the joining element holding apparatus 64 of the joining head 14 and must be ejected.

In a new filling process, the rotary body 44 is then filled in such a way that, in the next joining process, the joining elements 30 remaining in the revolving magazine 10 are supplied to the joining head 14 first. This can prevent individual joining elements 30 remaining in the revolving magazine 10 for a relatively long period of time, which could cause damage to or signs of wear on the joining elements 30.

FIG. 9 shows another filling variant using just one type of joining element; the variant is substantially similar to the variant shown in FIG. 8, although here it is not the case that all the chambers 46 bar one are filled initially, but instead one chamber 46 is left unfilled once half the chambers 46 have been filled. In this way, the unfilled chamber 46 can be associated with the unloading arrangement 50 following one complete rotation of the rotary body 44. In the method shown in FIG. 8, the rotary body is rotated approximately one and a half times in order to reach said arrangement.

FIG. 10 schematically shows the loading process using two different types of joining element 30', 30". In this case, the chambers 46' of a first circumferential sector of the rotary body 44 are first filled with one type of joining element 30'. Next, one chamber 46 of the rotary body 44 is left unfilled, and lastly the chambers 46" of a second circumferential sector of the rotary body 44 are filled with a second type of joining element 30".

Figure 10A:
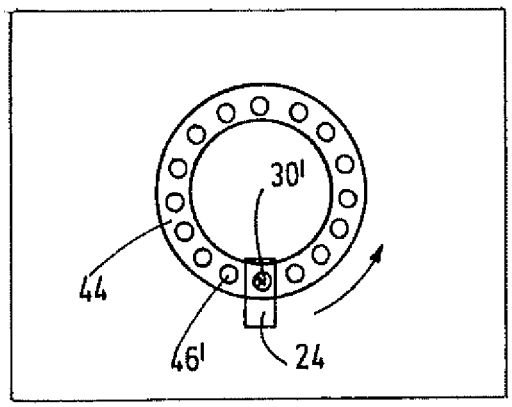
Figure 10B:
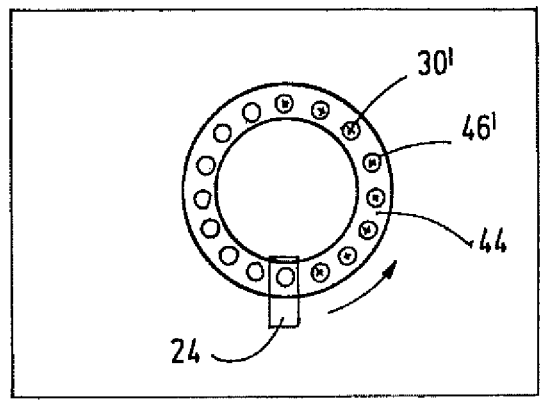
Figure 10C:
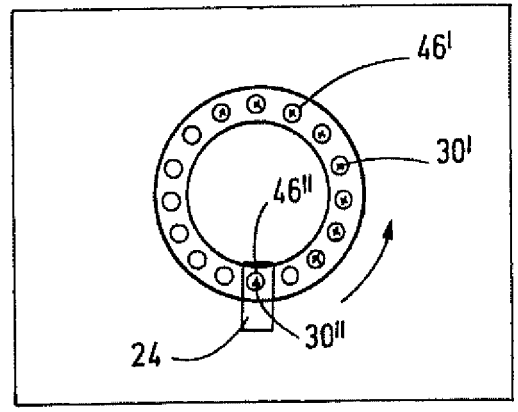
Figure 10D:
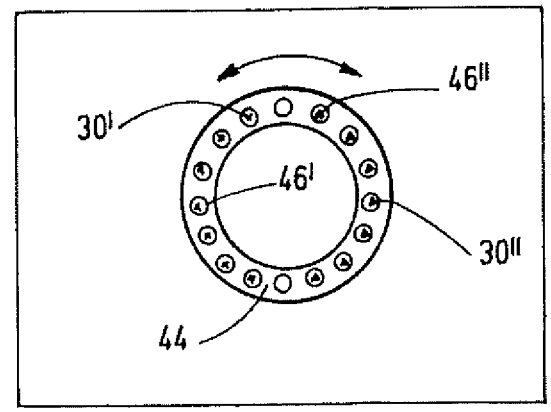

In this case, it is particularly preferable when withdrawing joining elements 30 for joining elements 30 of both joining element types to be able to be supplied to the joining head 14 in any order. As shown in FIG. 10d, this can be achieved by moving the rotary body 44 back and forth accordingly. It is particularly preferable in this case for the two chambers 46 separating the two circumferential sectors to not be filled with joining elements 30. In this way, when the revolving magazine is filled for the second time by accordingly rotating the rotary body through 180°, it can be ensured that the joining elements 30', 30" left over from the previous joining process are the first to be provided to the joining head 14 in a subsequent joining process.

To compensate for a "docking process", a compensating element can be provided below the loading station 20. This can prevent damage caused by the revolving magazine 10 not being correctly aligned with the loading station 20. In addition, tolerances can be compensated for or tolerance limits can be increased.

The present invention is particularly suitable for heavy bolts, such as earthing bolts, which require a great amount of compressed air and time to be supplied in standard joining systems. In principle, however, the present invention is not limited to one type of bolt, but rather is suitable for all bolt types.

Particularly preferably, it should be possible to join two types of bolt using one joining head 14, since the different bolt types can be supplied by the revolving magazine 10 without any significant delay. In accordance with the present invention, the clock rate can be greatly increased, and the requirements in terms of compressed air and thus energy consumption of such a system can be significantly reduced.

Although exemplary embodiments of the present invention have been shown and described, it will be appreciated by those skilled in the art that changes may be made to these embodiments without departing from the principles and spirit of the invention, the scope of which is defined in the appended claims and their equivalents.

What is claimed is:

1. A magazine for temporarily storing a plurality of joining elements loaded from a loading station and for feeding the joining elements to a joining head connectable to an assembly line robot, the magazine comprising:
    a housing connectable to the joining head;
    a drive motor;
    a rotary body that can be rotated about an axis of rotation by the drive motor, and partially defining a plurality of chambers for temporarily storing joining elements, each of the plurality of chambers is a cylindrical bore circumferentially fully defined by the rotary body and axially parallel with the axis of rotation and includes an axial opening;
    a loading arrangement operable for loading joining elements axially into the chambers;
    an unloading arrangement operable for discharging a joining element axially from the chambers toward the joining head; and
    wherein the loading arrangement and the unloading arrangement are structurally coupled together such that either a chamber can be loaded, or a chamber can be unloaded.

2. A magazine according to claim 1, wherein the loading arrangement and the unloading arrangement are mechanically coupled so as to implement the alternate loadability or unloadability.

3. A magazine according to claim 1, wherein at least one of the loading arrangement and the unloading arrangement can be mechanically actuated.

4. A magazine according to claim 3, wherein the loading arrangement includes a release slide that can move relative to the rotary body between a release position and a closed position, and, when moved towards a loading station, the release slide can be actuated through an opening in the housing by the loading station.

5. A magazine according to claim 1, wherein the chamber is formed so as to be rotationally symmetrical about a chamber axes that extends in parallel with the axis of rotation.

6. A magazine according to claim 1, wherein the housing further includes a first fastening device for fastening the housing to the robot, and a second fastening device for fastening the housing to the joining head.

7. A magazine according to claim 1, wherein the unloading arrangement includes a pivot joint receptacle for receiving, in the manner of a pivot joint, an end of a transfer duct into which a joining element can be unloaded from a chamber and transferred to the joining head.

8. A magazine according to claim 1, wherein the plurality of chambers includes first chambers and second chambers arranged in different circumferential sectors of the rotary body.

9. A joining apparatus for installing a joining element, the joining apparatus comprising:
    a joining head including a holding device for holding the joining element; and
    a magazine for temporarily storing a plurality of the joining element that can be transferred individually into the holding device, the magazine including:
        a housing connected to the joining head;
        a drive motor;
        a rotary body that can be rotated about an axis of rotation by the drive motor, and partially defining a plurality of chambers for temporarily storing the joining elements, each of the plurality of chambers is a cylindrical bore circumferentially fully defined by the rotary body and axially parallel with the axis of rotation and includes an axial opening;
        a loading arrangement operable for loading the joining elements axially into the chambers;
        an unloading arrangement operable for discharging a joining element axially from the chambers toward the joining head; and
        wherein the loading arrangement and the unloading arrangement are structurally coupled together such that either a chamber can be loaded or a chamber can be unloaded.

10. A joining apparatus according to claim 9, and further comprising a robot including an arm connected to a first side of the housing of the magazine, and the joining head is connected to a second side of the housing of the magazine facing away from the arm of the robot.

11. A method for loading joining elements from a loading station into a joining apparatus mounted on a robot and including a joining head, the method comprising the following steps:

a) providing a magazine for temporarily storing a plurality of the joining elements loaded from the loading station and for feeding the joining elements to the joining head, the magazine comprising:
  a housing connected to the joining head;
  a drive motor;
  a rotary body that can be rotated about an axis of rotation by the drive motor, and partially defining a plurality of chambers for temporarily storing joining elements, each of the plurality of chambers is a cylindrical bore circumferentially fully defined by the rotary body and axially parallel with the axis of rotation and includes an axial opening;
  a loading arrangement operable for loading joining elements axially into the chambers;
  an unloading arrangement operable for discharging a joining element axially from the chambers toward the joining head; and
  wherein the loading arrangement and the unloading arrangement are structurally coupled together such that either a chamber can be loaded or a chamber can be unloaded;
b) moving the joining apparatus towards a loading station and actuating the loading arrangement by contacting the loading station to uncover a top of a chamber of the magazine;
c) loading a joining element axially into the uncovered chamber; and
d) moving the joining head away from the loading station.

12. A method according to claim 11, wherein the plurality of chambers includes first chambers and second chambers arranged in different circumferential sectors of the rotary body, and wherein, in order to unload a first chamber, the rotary body is rotated in a first direction opposite to a second direction for unloading a second chamber.

* * * * *